United States Patent
Chan et al.

(10) Patent No.: US 9,762,857 B2
(45) Date of Patent: Sep. 12, 2017

(54) VIDEO AND AUDIO PROCESSING DEVICES AND VIDEO CONFERENCE SYSTEM

(71) Applicants: Chieh-Yu Chan, Taipei (TW); Ming-Che Weng, Taipei (TW)

(72) Inventors: Chieh-Yu Chan, Taipei (TW); Ming-Che Weng, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 14/993,092

(22) Filed: Jan. 12, 2016

(65) Prior Publication Data
US 2016/0205351 A1 Jul. 14, 2016

Related U.S. Application Data

(60) Provisional application No. 62/102,533, filed on Jan. 12, 2015.

(51) Int. Cl.
| | |
|---|---|
| *H04N 7/15* | (2006.01) |
| *H04N 5/06* | (2006.01) |
| *H04N 21/234* | (2011.01) |
| *H04N 21/236* | (2011.01) |
| *H04N 21/242* | (2011.01) |

(Continued)

(52) U.S. Cl.
CPC ............ *H04N 7/15* (2013.01); *H04N 5/06* (2013.01); *H04N 7/142* (2013.01); *H04N 7/147* (2013.01); *H04N 7/152* (2013.01); *H04N 21/23424* (2013.01); *H04N 21/23614* (2013.01); *H04N 21/242* (2013.01); *H04N 21/4302* (2013.01);

(Continued)

(58) Field of Classification Search
CPC combination set(s) only.
See application file for complete search history.

(56) References Cited

U.S. PATENT DOCUMENTS

| | | | | |
|---|---|---|---|---|
| 2008/0133640 | A1* | 6/2008 | Saito | H04L 67/38 709/201 |
| 2011/0102671 | A1* | 5/2011 | Tsai | H04N 21/4307 348/441 |

(Continued)

FOREIGN PATENT DOCUMENTS

| | | |
|---|---|---|
| CN | 103096024 | 5/2013 |
| TW | 200939775 | 9/2009 |

OTHER PUBLICATIONS

"Office Action of Taiwan Counterpart Application", issued on Feb. 8, 2017, p. 1-p. 10, in which the listed references were cited.

*Primary Examiner* — Joseph J Nguyen
(74) *Attorney, Agent, or Firm* — Jianq Chyun IP Office

(57) ABSTRACT

A video conference system including at least one client device and a host device able to be connected to the client devices and a remote device is provided. The host device obtains at least one piece of candidate video data as well as multiple pieces of to-be-integrated audio data, selects one piece of video data from the candidate video data, integrates the to-be-integrated audio data and sends the selected video data and the integrated audio data to the remote device, where the to-be-integrated audio data includes client audio data and host audio data, the candidate video data includes at least one piece of client video data and host video data. Video and audio processing devices corresponding to the client device and the remote device are also provided.

11 Claims, 5 Drawing Sheets

(51) Int. Cl.
- *H04N 21/43* (2011.01)
- *H04N 21/434* (2011.01)
- *H04N 21/44* (2011.01)
- *H04N 21/8547* (2011.01)
- *H04N 7/14* (2006.01)

(52) U.S. Cl.
CPC ... *H04N 21/4348* (2013.01); *H04N 21/44016* (2013.01); *H04N 21/8547* (2013.01)

(56) References Cited

U.S. PATENT DOCUMENTS

| | | | |
|---|---|---|---|
| 2012/0050456 A1* | 3/2012 | Arnao | H04N 7/152 348/14.12 |
| 2012/0098922 A1* | 4/2012 | Pennington | H04N 7/148 348/14.08 |
| 2013/0142452 A1* | 6/2013 | Shionozaki | G06T 7/0065 382/284 |
| 2015/0147048 A1* | 5/2015 | Kim | H04N 21/4852 386/282 |

* cited by examiner

VIDEO AND AUDIO PROCESSING DEVICES AND VIDEO CONFERENCE SYSTEM

CROSS-REFERENCE TO RELATED APPLICATION

This application claims the priority benefits of U.S. provisional application Ser. No. 62/102,533, filed on Jan. 12, 2015. The entirety of the above-mentioned patent application is hereby incorporated by reference herein and made a part of this specification.

TECHNICAL FIELD

The invention relates to a video and audio processing technique, in particular, to video and audio processing devices and a video conference system.

BACKGROUND

As electronic technology and communication network have been continuously developed, hardware, software, and features of video conferencing are notably enhanced. The current video conferencing allows multiple users to be connected with each other at anytime through electronic devices such as computers, smart phones, and tabular computers. While the users are voice calling each other, they would be able to see others' motion through screens, and a realistic telepresence experience in communication would be thereby enhanced. Accordingly, video conferencing has been extensively used in business communication so that enterprises are able to perform cross-regional communication internally and externally.

However, during a group-to-group video conference, all participants need to be close to a video conferencing device due to its insufficient wide angle lens or microphone receiving range, and thus the quality and efficiency of the video conference would be affected.

SUMMARY OF THE INVENTION

Accordingly, the invention is directed to video and audio processing devices and a video conference system, which provide a multi-participant video conference with a focusing effect on a keynote speaker.

A video and audio processing device including a communication circuit, an image capturing device, an audio receiving device, a memory, and a processor is provided in the invention. The communication circuit is configured to connect to another video and audio processing device. The image capturing device is configured to capture image signals. The audio receiving device is configured to capture audio signals. The memory is configured to store file data. The processor is coupled to the communication circuit, the image capturing device, an audio receiving device, and a memory, and is configured to perform the following steps. First, a first image signal and a first audio signal are respectively received from the image capturing device and the audio receiving device to generate first video data and first audio data. Next, whether the first audio data satisfies at least one transmission condition is determined. If yes, the first audio data and the first video data are transmitted to the another video and audio processing device through the communication circuit. If no, only the first audio data is transmitted to the another video and audio processing device through the communication circuit According to an embodiment of the invention, the video and audio processing device further includes a screen and an audio playing device. The screen is configured to display images, and the audio playing device is configured to play audio. The processor is further coupled to the screen and the audio playing device. The processor is further configured to receive remote video data and remote audio data from the another video and audio processing device through the communication circuit and to play the remote video data and the remote audio data respectively through the screen and the audio playing device.

According to an embodiment of the invention, the first audio data includes an audio frequency, and the processor is configured to determine whether the audio frequency satisfies a human frequency.

According to an embodiment of the invention, the first audio data further includes an audio volume received by the audio receiving device, and the processor is configured to determine whether the audio volume is greater than a volume threshold.

According to an embodiment of the invention, the first audio data further includes an audio signal-to-noise ratio received by the audio receiving device, and the processor is configured to determine whether the audio signal-to-noise ratio is greater than a signal-to-noise ratio threshold.

A video and audio processing device including a communication circuit, an image capturing device, an audio receiving device, a memory, and a processor is provided in the invention. The communication circuit is configured to connect to another video and audio processing device. The image capturing device is configured to capture image signals. The audio receiving device is configured to capture audio signals. The memory is configured to store file data. The processor is coupled to the communication circuit, the image capturing device, an audio receiving device, and a memory, and is configured to perform the following steps. First, at least one piece of candidate video data and a plurality pieces of to-be-integrated audio data are obtained, where each piece of the candidate video data corresponds to one piece of the to-be-integrated audio data. Next, one piece of the candidate video data is selected according to the to-be-integrated audio data corresponding to each piece of the candidate video to generate selected video data, and the pieces of the to-be-integrated audio data are integrated to generate integrated audio data. The integrated audio data and the selected video data are transmitted to the remote device through the communication circuit.

According to an embodiment of the invention, the processor is further configured to receive remote video data and remote audio data from the remote device through the communication circuit, and transmit the remote video data and remote audio data to each of the at least one other video and audio processing device through the communication circuit.

According to an embodiment of the invention, the video and audio processing device further includes a screen and an audio playing device. The screen is configured to display images, and the audio playing device is configured to play audio. The processor is further coupled to the screen and the audio playing device and configured to play the remote video data and the remote audio data respectively through the screen and the audio playing device.

According to an embodiment of the invention, each piece of the to-be-integrated audio data includes an audio volume, and the processor is configured to select the candidate video data corresponding to the to-be-integrated audio data with a maximal audio volume to be the selected video data.

According to an embodiment of the invention, each piece of the to-be-integrated audio data includes an audio signal-to-noise ratio, and the processor is configured to select the candidate video data corresponding to the to-be-integrated audio data with a maximal audio signal-to-noise ratio to be the selected video data.

According to an embodiment of the invention, each piece of the to-be-integrated audio data includes an audio receiving time period, and the processor is configured to select the candidate video data corresponding to the to-be-integrated audio data with a longest audio receiving time period to be the selected video data.

According to an embodiment of the invention, each piece of the to-be-integrated audio data includes s an audio receiving time period, and the processor is configured to select the candidate video data corresponding to the audio data with the audio receiving time period being greater than a time period threshold as the selected video data.

According to an embodiment of the invention, the processor is configured to perform audio mixing and/or audio denoising on the to-be-integrated audio data to generate the integrated audio data.

According to an embodiment of the invention, the processor is further configured to perform the following steps. A second image signal and a second audio signal are respectively received from the image capturing device and the audio receiving device to generate second video data and second audio data. Next, whether the second audio data satisfies at least one transmission condition is determined. If yes, the second video data and the second audio data are respectively set as one piece of the candidate video data and one piece of the to-be-integrated audio data. If no, only the second audio data set as one piece of the to-be-integrated audio data.

According to an embodiment of the invention, the second audio data includes an audio frequency, and the processor is configured to determine whether the audio frequency satisfies a human frequency.

According to an embodiment of the invention, the second audio data further includes an audio volume received by the audio receiving device, and the processor is configured to determine whether the audio volume is greater than a volume threshold.

According to an embodiment of the invention, the second audio data further includes an audio signal-to-noise ratio received by the audio receiving device, and the processor is configured to determine whether the audio signal-to-noise ratio is greater than a signal-to-noise ratio threshold.

A video conference system including at least one client device and a host device able to be connected to the client devices and a remote device is provided in the invention. Each of the client devices respectively generates client video data and client audio data. The host device obtains at least one piece of candidate video data and multiple pieces of to-be-integrated audio data, selects one piece of the candidate video data according to each of the to-be-integrated audio data to generate one piece of selected video data, integrates the pieces of the to-be-integrated audio data to generate one piece of integrated audio data, and transmits the selected video data and the integrated audio data to the remote device, where the pieces of the to-be-integrated audio data include the client audio data and the host audio data, the pieces of the candidate video data include at least one piece of the client video data and the host video data, and each piece of the candidate video data corresponds to one piece of the audio data.

According to an embodiment of the invention, for each of the client devices, the client device determines whether the client audio data satisfies the at least one transmission condition. If yes, the client device transmits the client audio data and the client video data to the host device, and if no, the client device transmits only the client audio data to the host device.

According to an embodiment of the invention, the host device further receives remote video data and remote audio data from the remote device and transmits the remote video data and the remote audio data to each of the at least one client device.

In summary, in terms of the video and audio processing devices and the video conference system proposed in the invention, the host device would not only integrate each piece of audio data generated in the local end and transmit the integrated audio data to the remote device, it would further transmit one piece of video data to the remote device according to audio parameters of each piece of the audio data. Accordingly, even when there are multiple participants in the video conference at the local end, a keynote speaker of the local end would still be focused by the user of the remote device, and the quality and the efficiency of the video conference would thereby be enhanced.

In order to make the aforementioned features and advantages of the present invention comprehensible, preferred embodiments accompanied with figures are described in detail below. It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
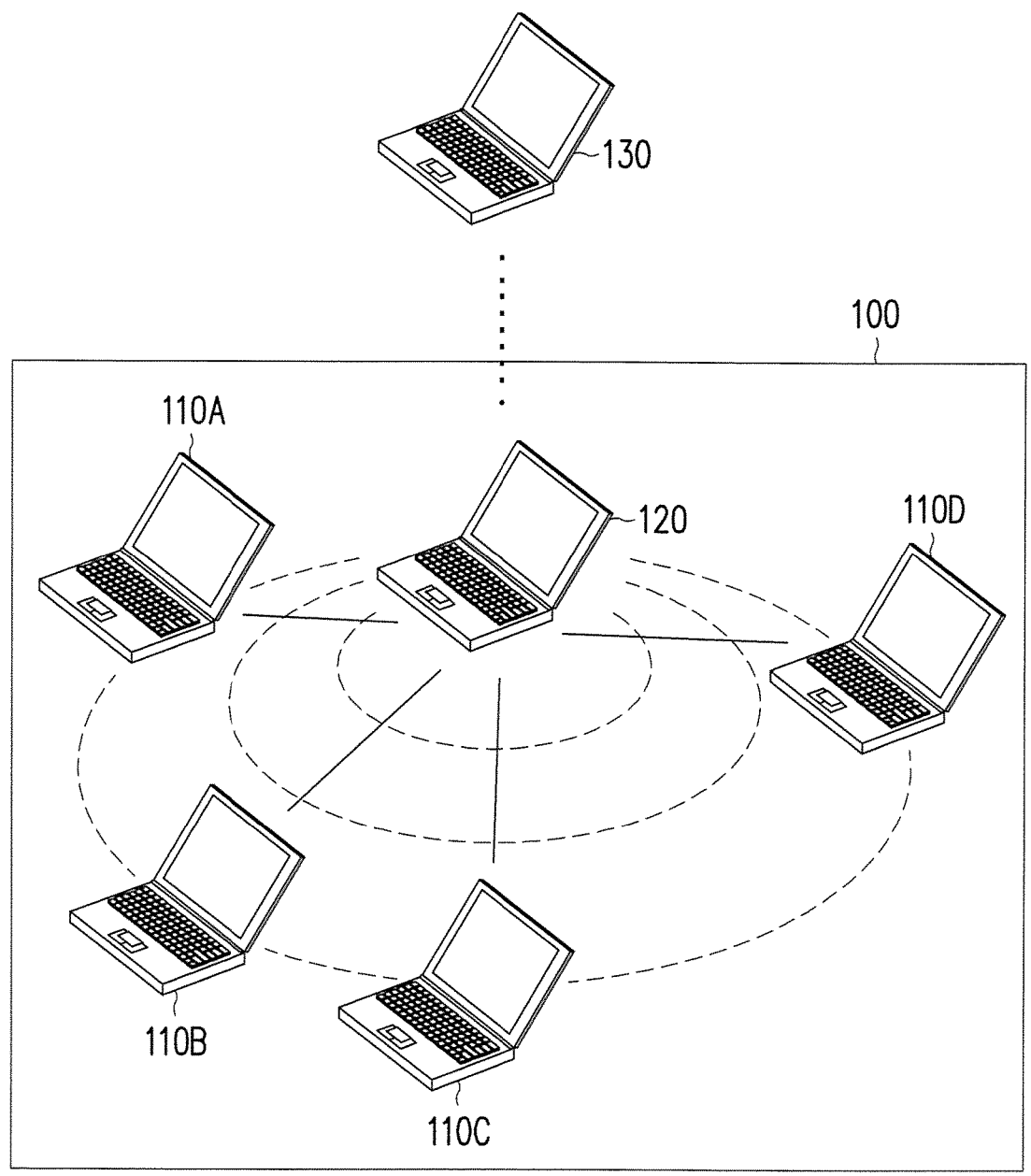
FIG. 1A illustrates a schematic diagram of a video conference system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts. Indeed, various embodiments of the invention may be embodied in many different forms and should not be construed as limited to the embodiments set forth herein; rather, these embodiments are provided so that this invention will satisfy applicable legal requirements.

FIG. 1A illustrates a schematic diagram of a video conference system according to an embodiment of the invention.

Referring to FIG. 1A, a video conference system 100 includes client devices 110A-110D and a host device 120, where the host device 120 could be connected to the client devices 110A-110D and a remote device 130. The client devices 110A-110D and the host device 120 are local devices. The client devices 110A-110D could be wirelessly connected to the host device 120 through a local network or wiredly connected to the host device 120. Additionally, the host device 120 could be connected to the remote device 130 through the internet. It should be noted that, the client devices 110A-110D in the video conference system 100 are only for illustrative purposes. In other embodiments, the video conference system 100 could provide any number of client devices to be connected to the host device 120. The invention is not limited in this regard.

Figure 1B:
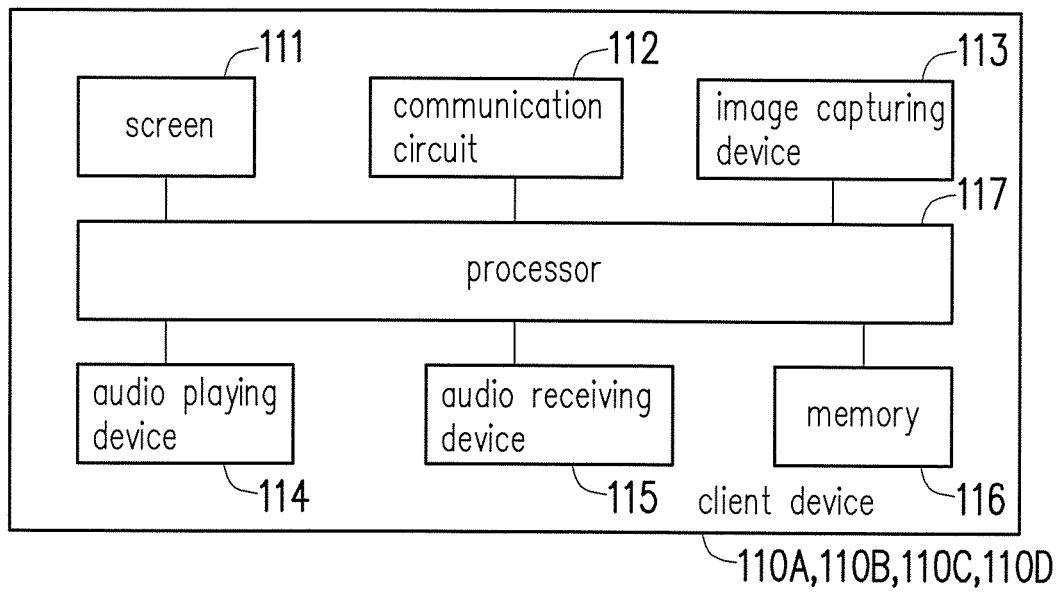
FIG. 1B illustrates a schematic diagram of a client device according to an embodiment of the invention.

FIG. 1B illustrates a schematic diagram of a client device according to an embodiment of the invention.

Referring to FIG. 1B, each of the client devices 110A-110D includes a screen 111, a communication circuit 112, an image capturing device 113, an audio playing device 114, an audio receiving device 115, a memory 116, and a processor 117. In the present embodiment, each of the client devices 110A-110D could be an electronic device with audio and video processing features such as a personal computer, a laptop computer, a smart phone, a tabular computer, a personal digital assistant, and so forth. The invention is not limited herein. The client device 110A would be described hereafter for illustrative purposes.

The screen 111 is configured to display images outputted by the client device 110A for the user. In the present embodiment, the screen 111 could be a liquid crystal display (LCD), a light-emitting diode (LED) display, a field emission display (FED), or other types of displays externally connected to or built-in in the client device 110A.

The communication circuit 112 is configured to connect to other devices through a communication network and could be a component capable of supporting wireless internet access such as WiMAX, Wi-Fi, 3G, or 4G, wired internet access such as ADSL or optical fibre network. The invention is not limited in this regard.

The image capturing device 113 is configured to capture images in front thereof and could be a camera with charge-coupled device (CCD) elements, complementary metal-oxide semiconductor (CMOS) elements, or other types of lens. The image capturing device 113 could be a web camera, a digital camera, a single lens reflex camera, or a digital camcorder built-in in the client device 110A or externally connected to the client device 110A.

The audio playing device 114 is configured to play audio and includes a speaker. The audio receiving device 115 is configured to receive audio and includes a microphone. The audio playing device 114 and the audio receiving device 115 could be externally connected to or built-in in the client device 110A. Moreover, when the audio playing device 114 and the audio receiving device 115 are externally connected to the client device 110A, they could be integrated as a single device such as a headset.

The memory 116 is configured to store file data and could be one or a combination of a stationary or mobile random access memory (RAM), a read-only memory (ROM), a flash memory, a hard drive or other similar devices.

The processor 117 is coupled to the screen 111, the communication circuit 112, the image capturing device 113, the audio playing device 114, the audio receiving device 115, and the memory 116, and is configured to control and integrate the operations among the aforementioned components. The processor 117 could be, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of above-mentioned devices.

Moreover, in an embodiment, the client device 110A could be an electronic device only including the communication circuit 112, the image capturing device 113, the audio receiving device 115, the memory 116, and the processor 117, and could be externally connected to another electronic device with the screen 111 and the audio playing device 114 such as a television.

Figure 1C:
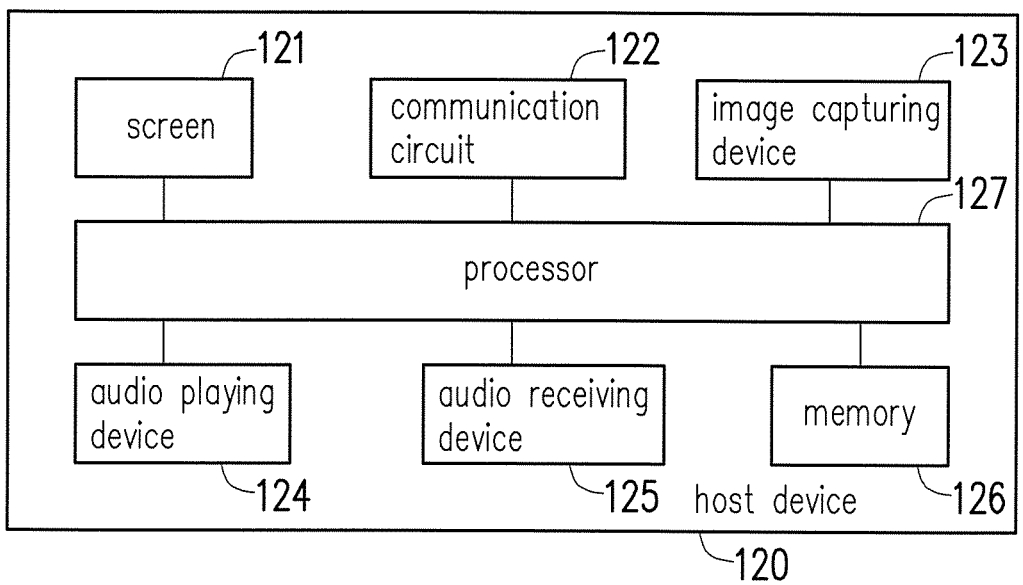
FIG. 1C illustrates a schematic diagram of a host device according to an embodiment of the invention.

FIG. 1C illustrates a schematic diagram of a host device according to an embodiment of the invention.

Referring to FIG. 1C, the host device 120 includes a screen 121, a communication circuit 112, an image capturing device 123, an audio playing device 124, an audio receiving device 125, a memory 126, and a processor 127. In the present embodiment, the host device 120 could also be an electronic device with audio and video processing features such as a personal computer, a laptop computer, a smart phone, a tabular computer, a personal digital assistant, and so forth. The invention is not limited in this regard. The screen 121, the communication circuit 122, the image capturing device 123, the audio playing device 124, the audio receiving device 125, the memory 126, and the processor 127 are respectively similar to the screen 111, the communication circuit 112, the image capturing device 113, the audio playing device 114, the audio receiving device 115, the memory 116, and the processor 117 of each of the client devices 110A-110D. The description of the components may refer to previous paragraphs and would not be repeated herein.

In the present embodiment, while the local devices (i.e. the client devices 110A-110D and the host device 120) in the video conference system 100 are having a video conference with the remote device 130, each of the client devices 110A-110D would transmit its generated client audio data to the host device 120 and also determine whether to further transmit its generated client video data to the host device 120. The host device 120 itself would also generate host audio data and host video data. Next, the host device 120 would integrate audio data and select video data, and then transmit the integrated audio data and the selected video data to the remote device 130 so as to facilitate a video conference with a focusing effect on a keynote speaker. Specific approaches for audio and video processing performed by the client devices 110A-110D and the host device 120 would be described as follows.

Figure 2:
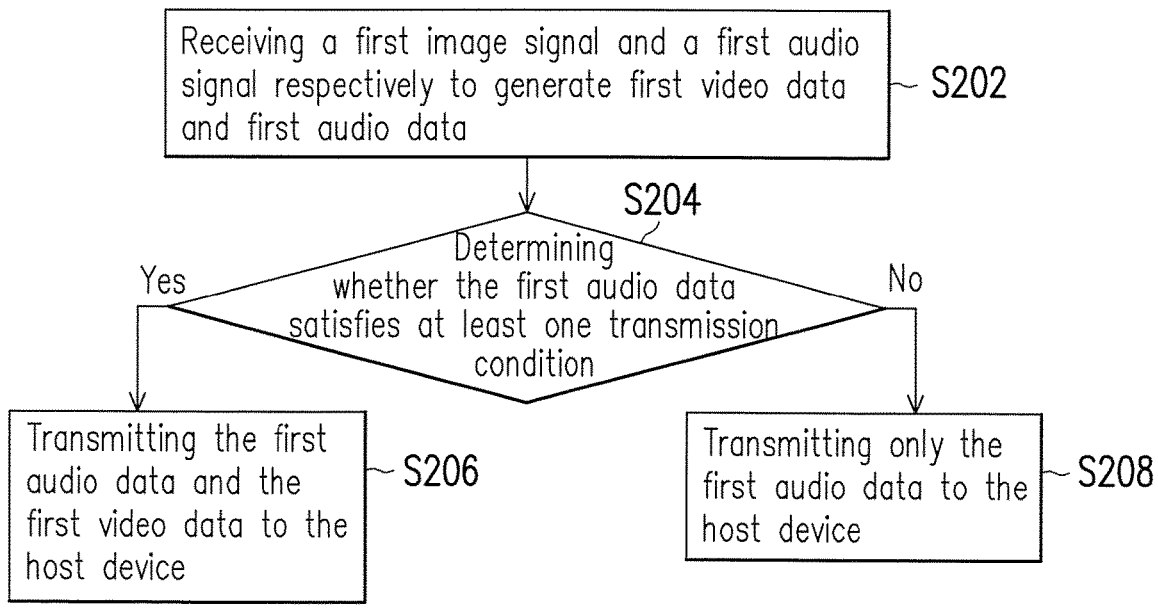
FIG. 2 illustrates a flowchart of an audio and video processing method according to an embodiment of the invention.

FIG. 2 illustrates a flowchart of an audio and video processing method according to an embodiment of the invention. The method in the present embodiment is adapted to the client devices 110A-110D as illustrated in FIG. 1B. Detailed steps of the audio and video processing method would be described along with each component of the client device 110A. The client devices 110B-110D could be deduced in a similar fashion. However, in practical, the method in the present embodiment is also adapted to an electronic device which only composed of the communication circuit 112, the image capturing device 113, the audio receiving device 115, the memory 116, and the processor 117. The invention is not limited herein.

Referring to both FIG. 1B and FIG. 2, the processor 117 of the client device 110A would first receive a first image signal and a first audio signal respectively from the image capturing device 113 and the audio receiving device 115 to generate first video data and first audio data (Step S202). Herein, the first image signal is a motion image of the user of the client device captured by the image capturing device 113, and the first audio signal is an ambient sound of the client device 110A captured by the audio receiving device 115. The processor 117 would perform analog-to-digital conversion on the first image signal and the first audio signal captured by the image capturing device 113 and the audio receiving device 115 to generate the first video data and the first audio data. Moreover, the processor 117 may optionally compress the first video data for different network transmission bandwidth requirements. The invention is not limited in this regard.

Next, the processor 117 would determine whether the first audio data satisfies at least one transmission condition (Step S204). That is, the processor 117 would determine whether the first audio signal captured by the audio receiving device 114 is a voice of the user of the client device 110A and whether the user of the client device 110A is a possible keynote speaker of the video conference based on audio parameters of the first audio data, and thereby determine whether the first audio data satisfies the transmission condition. The audio parameters could be an audio frequency, an audio volume, an audio signal-to-noise ratio, and so forth.

To be specific, in an embodiment, since the first audio signal is the ambient sound captured by the audio receiving device 115, the processor 117 would first determine whether the audio frequency of the first audio data satisfies a human voice frequency. If so, the processor 117 would determine that the user of the client device 110A is a possible keynote speaker of the video conference. For example, frequencies for male voices range from 85 Hz to 180 Hz, and frequencies for female voices range from 165 Hz to 255 Hz. The processor 117 may determine whether the audio frequency of the first audio data falls within these ranges and thereby determine whether the first audio data corresponds to a human voice. When the audio frequency of the first audio data indeed corresponds to a human voice, the processor 117 would determine that the first audio data satisfies the transmission condition.

In an embodiment, after the processor 117 determines that the first audio data corresponds to a human voice, it would further determine whether the audio volume of the first audio data is greater than a predetermined volume threshold to determine whether the user of the client device 110A is a possible keynote speaker of the video conference. In general, an average volume of human voices is around 60 dB, and the volume threshold could be thus set to, for example, 55 dB, where an error of tolerance is allowed. Moreover, the processor 117 may change the predetermined volume threshold at anytime according to the environment of the video conference or manual adjustment performed by the user of the client device 110A. When the audio frequency of the first audio data indeed corresponds to a human voice and the audio volume of the first audio data is greater than the volume threshold, the processor 117 would determine that the first audio data satisfies the transmission condition.

In an embodiment, similar to the concept of the audio volume, after the processor 117 determines that the first audio data corresponds to a human voice, it would further determine whether the user of the client device 110A is a possible keynote speaker of the video conference by determining whether the audio noise-to-signal ratio of the first audio data is greater than a predetermined noise-to-signal ratio, where the noise-to-signal ratio could be thus set to, for example, 55 dB. Moreover, the processor 117 may change the predetermined noise-to-signal ratio threshold at anytime according to the environment of the video conference or manual adjustment performed by the user of the client device 110A. When the audio frequency of the first audio data indeed corresponds to a human voice and the audio noise-to-signal ratio of the first audio data is greater than the noise-to-signal ratio threshold, the processor 117 would determine that the first audio data satisfies the transmission condition.

In an embodiment, the processor 117 may determine whether the user of the client device 110A is a possible keynote speaker of the video conference based on all the audio frequency, the audio volume, and the audio noise-to-signal ratio. When the audio frequency of the first audio data corresponds to a human voice, the audio volume of the first audio data is greater than the volume threshold, and the audio signal-to-voice ratio of the first audio data is greater than the noise-to-signal ratio threshold, the processor would determine that the first audio data satisfies the transmission condition.

Next, when the processor 117 determines that the first audio data satisfies the transmission condition, it indicates that the user of the client device 110A could be a possible keynote speaker of the video conference. Hence, the processor 117 would transmit the first audio data and the first video data to the host device 120 through the communication circuit 112 (Step S206). On the other hand, when the processor 117 determines that the first audio data does not satisfy any transmission condition, it indicates that the user of the client device 110A is not a possible keynote speaker of the video conference. Hence, the processor 117 would transmit only the first audio data to the host device 120 through the communication circuit 112 (Step S208) to reduce the amount of data transmission at the local end. It should be noted that, the first video data transmitted to the host device 120 would only be one piece of candidate video data to be transmitted to the remote device 130 in the follow-up steps. Namely, the host device 120 would select and transmit one piece from multiple pieces of candidate video data to the remote device 130. Moreover, the first audio data transmitted to the host device 120 would be integrated with other pieces of audio data. More details would be given later on.

Figure 3:
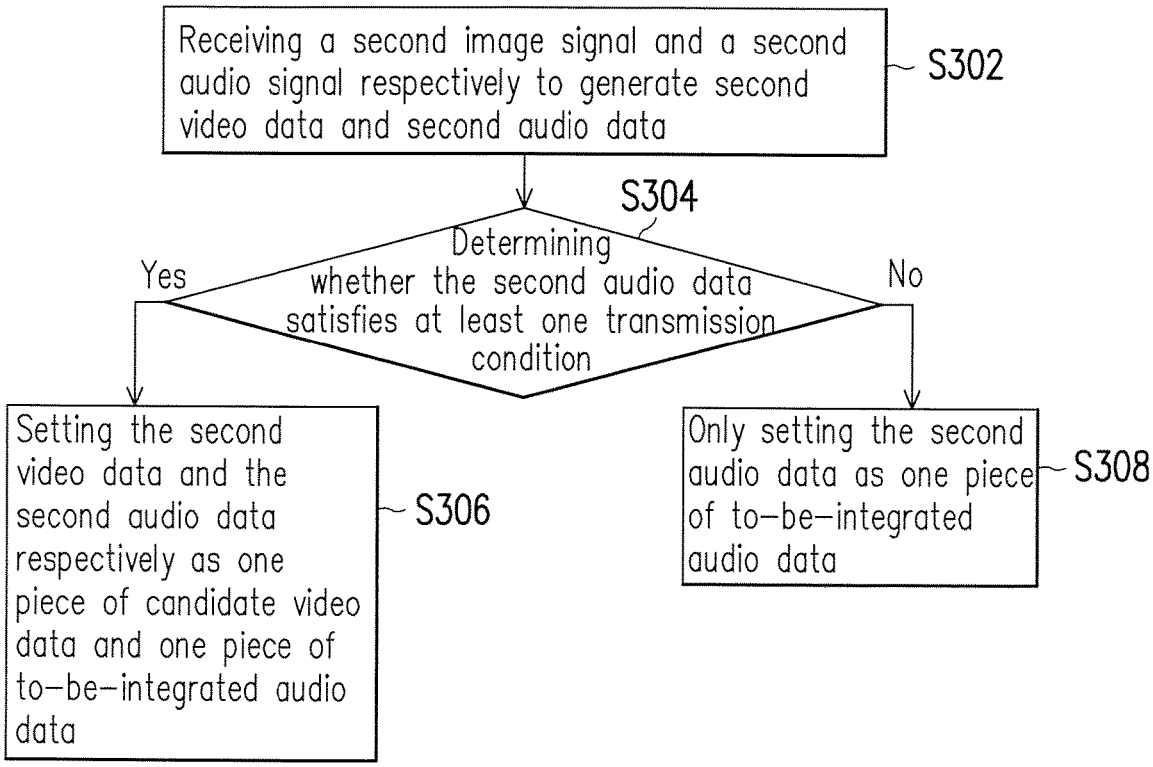
FIG. 3 illustrates a flowchart of an audio and video processing method according to an embodiment of the invention.

The host device 120 would not only receive the audio data and any possible video data from the client devices 110A-110D, but would also generate audio data and video data itself. To be specific, FIG. 3 illustrates a flowchart of an audio and video processing method according to an embodiment of the invention. The method in the present embodiment is adapted to the host device 120 in FIG. 1C. Detailed steps of the audio and video processing method would be described along with each component of the host device 120. However, in practical, the method in the present embodiment is also adapted to an electronic device which only composed by the communication circuit 122, the image capturing device 123, the audio receiving device 125, the memory 126, and the processor 127. The invention is not limited herein.

Referring to both FIG. 1C and FIG. 3, the processor 127 of the host device 120 would first receive a second image signal and a second audio signal respectively from the image capturing device 123 and audio receiving device 125 to generate second video data and second audio data (Step S302), and the processor 127 would determine whether the second audio data satisfies at least one transmission condition (Step S304). Herein, Step S302 and Step S304 are executed by the processor 127 of the host device 120 in a similar fashion as Step S202 and Step S204 executed by the client devices 110A-110D. Detailed description may refer to the previous paragraphs and would not be repeated herein.

Distinguished from the embodiment of FIG. 2, since the host device 120 would perform audio data integration and video data selection, when the processor 127 determines that the second audio data satisfies the transmission condition, it represents that the user of the host device 120 is a possible keynote speaker of the video conference, and the processor 127 would set the second video data and the second audio data respectively as one piece of candidate video data and one piece of to-be-integrated audio data (Step S306). On the other hand, when the processor 127 determines that the second audio data does not satisfy any transmission condition, it would only set the second audio data as one piece of to-be-integrated audio data (Step S308); that is, the user of the host device 120 is not a possible keynote speaker of the video conference.

Figure 4:
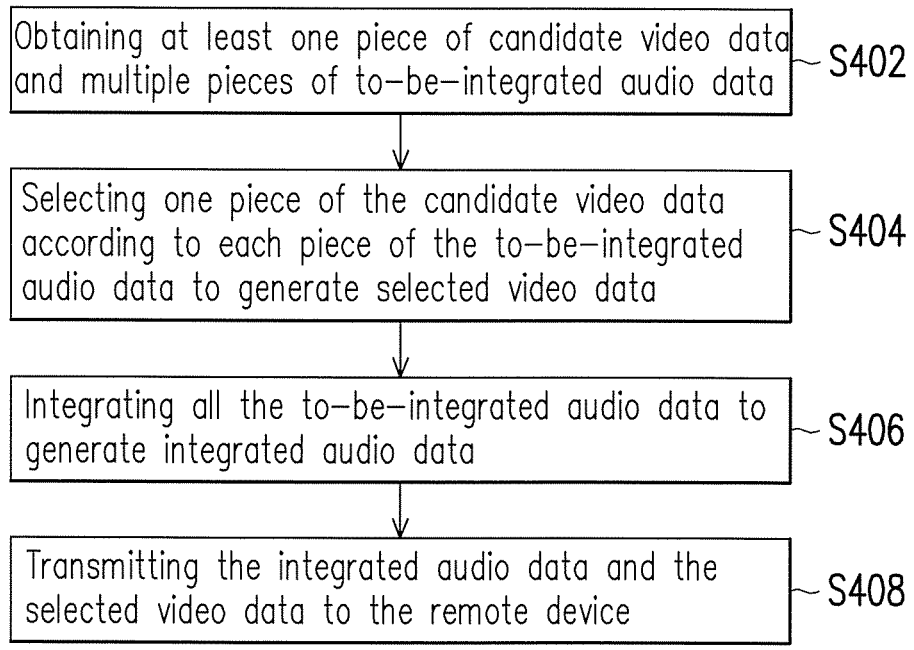
FIG. 4 illustrates a flowchart of an audio and video processing method according to an embodiment of the invention.

After the host device 120 obtains all the to-be-integrated audio data and the candidate video data from itself and the client devices 110A-110D, it would integrate the to-be-integrated audio data and select the candidate video data as transmission data to be transmitted to the remote device 130. To be specific, FIG. 4 illustrates a flowchart of an audio and video processing method according to an embodiment of the invention. The method in the present embodiment is adapted to the host device 120 in FIG. 1C. Detailed steps of the audio and video processing method would be described along with each component of the host device 120.

Referring to both FIG. 1C and FIG. 4, the processor 127 of the host device 120 would obtain at least one piece of candidate video data and multiple pieces of to-be-integrated audio data (Step S402). Herein, the candidate video data and the to-be-integrated audio data are the data obtained after the steps in FIG. 2 and in FIG. 3 are respectively executed by the client devices 110A-110D and the host device 120.

Next, the processor 127 would select one piece of the candidate video data according to each piece of the to-be-integrated audio data to generate selected video data (Step S404). To be specific, the candidate video data is merely the video data of all possible keynote speakers of the video conference, and the processor 127 would thus compare the to-be-integrated audio data corresponding to the candidate video data (i.e. the to-be-integrated audio data from the same source device as the candidate video data) and further transmit the selected video data to the remote device 130. Since the to-be-integrated audio data corresponding to all the candidate video data satisfies the human frequency, the processor 127 would select the video data to be transmitted according to audio parameters of the corresponding to-be-integrated audio data. Herein, the audio parameters could be an audio receiving time period, an audio volume, an audio noise-to-signal ratio, and so forth.

In an embodiment, the processor 127 would select the candidate video data corresponding to the to-be-integrated audio data with a longest audio receiving time period to be the selected video data. That is, the user who speaks first would be considered as the keynote speaker of the video conference at the moment in the present embodiment.

In an embodiment, the processor would select the candidate video data corresponding to the audio data with the audio receiving time period being greater than a time period threshold as the selected video data, where the time period threshold could be, for example, 0.5 s. It is considered in the present embodiment that more than one user might talk at the same time, and thus the processor 127 would only consider the user with the audio receiving time period being greater than the time period threshold as the keynote speaker of the video conference to prevent the video screen being switched among different device users within a short period of time.

In an embodiment, the processor 126 would select the candidate video data corresponding to the to-be-integrated audio data with a maximal audio volume to be the selected video data. That is, the users corresponding to other pieces of candidate video data may have a private discussion, but they are not keynote speakers of the video conference.

In an embodiment, similar to the concept of the audio volume, the processor 127 would select the candidate video data corresponding to the to-be-integrated audio data with a maximal audio noise-to-signal ratio to be the selected video data.

In an embodiment, the processor 127 could also make the selection based on different combinations of the audio receiving time period, the audio volume and the audio noise-to-signal ratio for a more accurate selected result.

In an embodiment, when there only exists one single piece of candidate video data, the processor 127 would directly set it as the selected video data. Yet in another embodiment, when there is no candidate video data, it represents that the users at the local end are silent. The processor 127 could continue transmitting the video data of the keynote speaker at the previous time point as the selected video data.

On the other hand, the processor 127 would integrate all the to-be-integrated audio data to generate integrated audio data (Step S406). To be specific, the processor 127 would perform audio mixing and/or audio denoising on the pieces of to-be-integrated audio data so that the integrated audio data would have better quality.

Next, the processor 127 would transmit the integrated audio data and the selected video data to the remote device 130 through the communication circuit 112 (Step S408). In other words, the audio data and the video data received by the remote device 130 from the host device 120 are the video of the keynote speaker and the integrated audio at the local end so as to facilitate a video conference with a focusing effect on a keynote speaker.

Additionally, the host device 120 would concurrently receive remote video data and remote audio data from the remote device 130 through the communication circuit 122, and play the remote video data and the remote audio data respectively through the screen 121 and the audio playing device 124. Moreover, the host device 120 would also transmit the remote video data and the remote audio data to the client devices 110A-110D, and each of the client devices 110A-110D would play the remote video data and the remote audio data through the screen 111 and the audio playing device 114.

Figure 5A:
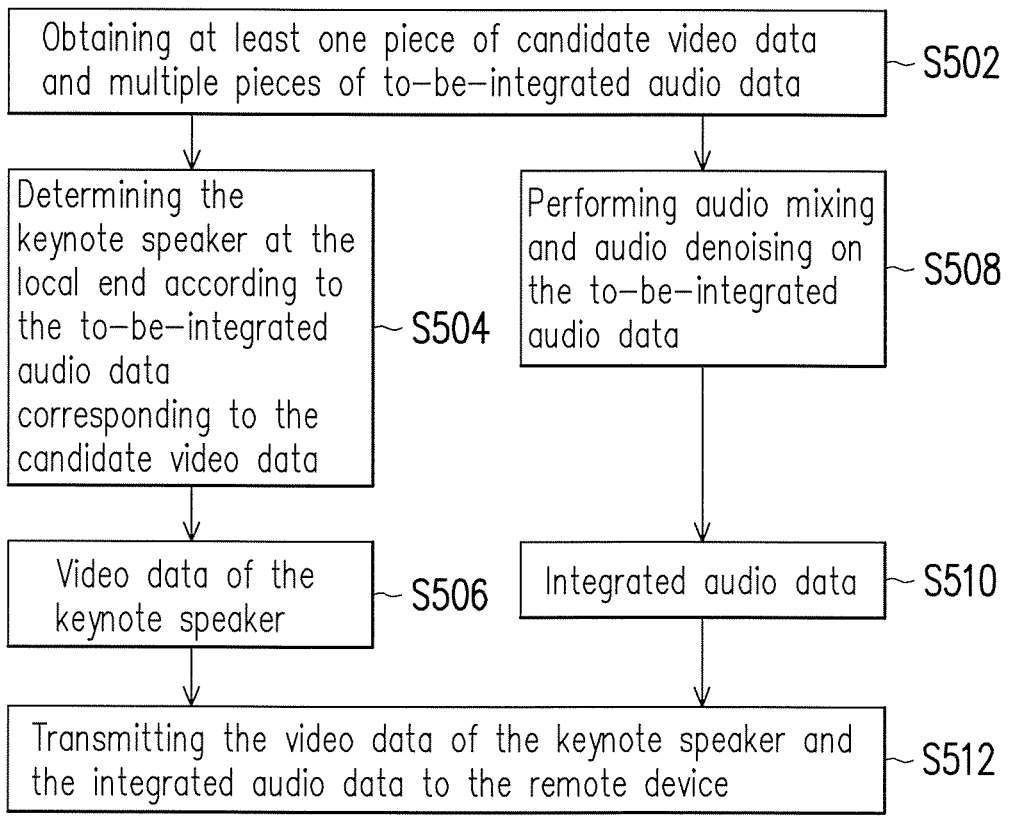
FIG. 5A illustrates a flowchart of an audio and video processing method according to an embodiment of the invention.
Figure 5B:
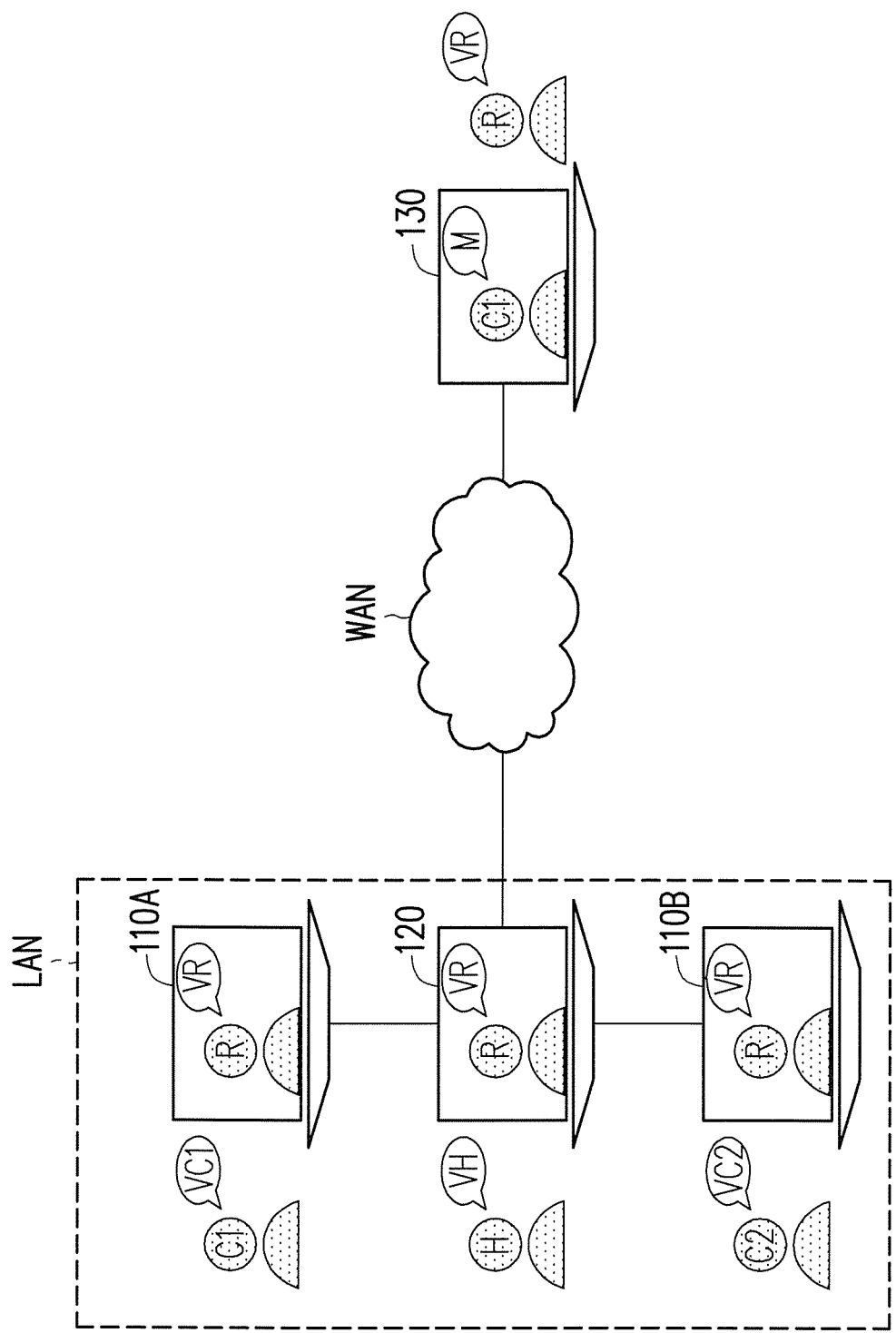
FIG. 5B illustrates a schematic diagram of the application scenario of FIG. 5A.

FIG. 5A illustrates a flowchart of an audio and video processing method describing an application scenario of the video conference system 100 in FIG. 1A according to an embodiment of the invention. FIG. 5B illustrates a schematic diagram of the application scenario of FIG. 5A.

Referring to both FIG. 1A and FIG. 5A, the host device 120 of the video conference system 100 would first obtain at least one piece of candidate video data and multiple pieces of to-be-integrated audio data (Step S502). Herein, the candidate video data is a video of possible keynote speakers among all device users in the local end, and the to-be-integrated audio data is the voices of the device users at the local end. Next, the host device 120 would determine the keynote speaker at the local end according to the to-be-integrated audio data corresponding to the candidate video data (Step S504) to generate video data of the keynote speaker (Step S506). On the other hand, the host device 120 would perform audio mixing and audio denoising on the to-be-integrated audio data (Step S508) to generate integrated audio data (Step S510). Next, the host device 120 would transmit the video data of the keynote speaker and the integrated audio data to the remote device 130 (Step S512). Detailed description may refer to the previous paragraphs and would not be repeated herein.

Now referring to FIG. 5B, in the present embodiment, the client devices 110A-110B would be respectively connected to the host device 120 via a network LAN, and the host device 120 would be connected to the remote device 130 via a network WAN. Assume that the host device 120 determines that a user C1 of the client device 110A is a keynote speaker in FIG. 5A, it would transmit video data of the user C1 to the remote device 130. Moreover, the host device 120 would transmit audio data M integrated from audio data VC1, VC2, and VH of users C1, C2, and H to the remote devices 130, and the remote device 130 would play the video of the user C1 and the audio of the users C1, C2, and H. Also, the host device 120 would receive and transmit video data and audio data VR of a user R to the client devices 110A-110B, and the client devices 110A-110B as well as the host device 120 would concurrently play the video and audio of the user R.

In summary, in terms of the video and audio processing devices and the video conference system proposed in the invention, the host device would not only integrate each piece of audio data generated in the local end and transmit the integrated audio data to the remote device, it would further transmit one piece of video data to the remote device according to audio parameters of each piece of the audio data. Accordingly, even when there are multiple participants in the video conference at the local end, a keynote speaker of the local end would still be focused by the user of the remote device, and the quality and the efficiency of the video conference would thereby be enhanced.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. An video and audio processing device comprising:
  a communication circuit, configured for connecting to at least one other local device and a remote device;
  an image capturing device, configured for capturing image signals;
  an audio receiving device, configured for capturing audio signals;
  a memory, configured for storing file data; and
  a processor, coupled to the communication circuit, the image capturing device, the audio receiving device, and the memory, and configured for:
    obtaining a plurality pieces of candidate video data from the at least one other local device through the communication circuit and from the image capturing device;
    obtaining a plurality pieces of candidate audio data from the at least one other local device through the communication circuit and from the audio receiving device and;
    selecting only one piece of the candidate video data according to at least one of a maximal audio volume, a maximal audio signal-to-noise ratio, a longest audio receiving time period, and an audio receiving time period being greater than a time period threshold of the pieces of candidate audio data corresponding to each piece of the candidate video to generate selected video data;
    integrating the pieces of the candidate audio data to generate integrated audio data; and
    transmitting the integrated audio data and the selected video data to the remote device through the communication circuit.

2. The video and audio processing device according to claim 1, wherein the processor is further configured for:
  receiving remote video data and remote audio data from the remote device through the communication circuit; and
  transmitting the remote video data and remote audio data to each of the at least one other local device through the communication circuit.

3. The video and audio processing device according to claim 2 further comprising:
  a screen, configured for displaying images; and
  an audio playing device, configured for playing audio, wherein the processor is further coupled to the screen and the audio playing device and is configured for:
    playing the remote video data and the remote audio data respectively through the screen and the audio playing device.

4. The video and audio processing device according to claim 1, wherein the processor is configured for integrating the pieces of candidate audio data to generate the integrated audio data comprising:
  performing at least one of audio mixing and audio denoising on the candidate audio data to generate the integrated audio data.

5. The video and audio processing device according to claim 1, wherein the processor is further configured for:
  receiving a second image signal and a second audio signal respectively from the image capturing device and the audio receiving device to generate second video data and second audio data;
  determining whether the second audio data satisfies at least one transmission condition;
  in response to the second audio data being determined satisfying the at least one transmission condition, setting the second video data and the second audio data respectively as one piece of the candidate video data and one piece of the candidate audio data; and
  in response to the second audio data being determined not satisfying any of the at least one transmission condition, only setting the second audio data as one piece of the candidate audio data.

6. The video and audio processing device according to claim 5, wherein the second audio data comprises an audio frequency, and wherein the processor is configured for determining whether the second audio data satisfies the at least one transmission condition comprising:

determining whether the audio frequency satisfies a human frequency.

7. The video and audio processing device according to claim 5, wherein the second audio data further comprises an audio volume received by the audio receiving device, and wherein the processor is configured for determining whether the second audio data satisfies the at least one transmission condition comprising:
   determining whether the audio volume is greater than a volume threshold.

8. The video and audio processing device according to claim 5, wherein the video data further comprises an audio signal-to-noise ratio received by the audio receiving device, and wherein the processor is configured for determining whether the second audio data satisfies the at least one transmission condition comprising:
   determining whether the audio signal-to-noise ratio is greater than a signal-to-noise ratio threshold.

9. A video conference system comprising:
   at least one client device, wherein each of the at least one client device respectively generates client video data and client audio data; and
   a host device, connected to each of the at least one client device and a remote device, wherein the host device generates host video data and host audio data, obtains the client video data and the client audio data from the at least one client device, selects only one piece of the host video data and the client video data according to at least one of a maximal audio volume, a maximal audio signal-to-noise ratio, a longest audio receiving time period, and an audio receiving time period being greater than a time period threshold of each of the host audio data and the client audio data to generate selected video data, integrates the host audio data and the client audio data to generate integrated audio data, and transmits the selected video data and the integrated audio data to the remote device.

10. The video conference system according to claim 9, wherein for each of the at least one client device:
    the client device determines whether the client audio data satisfies at least one transmission condition;
    in response to the client audio data being determined satisfying the at least one transmission condition, the client device transmits the client audio data and the client video data to the host device; and
    in response to the client audio data being determined not satisfying the at least one transmission condition, the client device transmits only the client audio data to the host device.

11. The video conference system according to claim 9, wherein the host device further receives remote video data and remote audio data from the remote device and transmits the remote video data and the remote audio data to each of the at least one client device.

\* \* \* \* \*